United States Patent [19]

Thubeauville

[11] 4,244,786
[45] Jan. 13, 1981

[54] DOUBLE FLUE ARRANGEMENT IN HEATING WALLS FOR HORIZONTAL COKE OVENS

[75] Inventor: Heinz Thubeauville, Bochum, Fed. Rep. of Germany

[73] Assignee: Dr. C. Otto & Comp. G.m.b.H., Bochum, Fed. Rep. of Germany

[21] Appl. No.: 935,404

[22] Filed: Aug. 21, 1978

[30] Foreign Application Priority Data

Aug. 24, 1977 [DE] Fed. Rep. of Germany ....... 2738116

[51] Int. Cl.³ .......................... C10B 5/04; C10B 5/18; C10B 29/02
[52] U.S. Cl. .................................. 202/142; 202/143; 202/223; 202/267 R; 202/270; 432/181; 165/9.3
[58] Field of Search ............... 202/138, 139, 140, 141, 202/142, 143, 144, 222, 223, 224, 225, 267 R, 270; 432/180, 181, 182; 165/9.1, 9.3

[56] References Cited

U.S. PATENT DOCUMENTS

| | | | |
|---|---|---|---|
| 1,678,801 | 7/1928 | Becker | 202/141 |
| 3,359,184 | 12/1967 | Thiersch et al. | 202/138 X |
| 3,996,109 | 12/1976 | Pries | 202/141 |
| 4,059,885 | 11/1977 | Oldengott | 202/138 X |

FOREIGN PATENT DOCUMENTS

| | | | |
|---|---|---|---|
| 217454 | 6/1924 | United Kingdom | 202/141 |
| 1340920 | 12/1973 | United Kingdom | 202/138 |

*Primary Examiner*—Frank W. Lutter
*Assistant Examiner*—Roger F. Phillips
*Attorney, Agent, or Firm*—Thomas H. Murray; Clifford A. Poff

[57] ABSTRACT

Double heating flues are arranged transversely to the horizontal axes of coke oven chambers within heating walls therefor. Side walls between each double heating flue have an internal passageway in the lower part communicating by exit orifices at vertically-spaced locations with the heating flues at the opposite sides of the side wall. The lower parts of the side walls converge horizontally into side wall portions some of which abut against the vertical heating wall and others extend through the vertical heating wall in an alternating arrangement of superimposed bricks. The upper parts of the side walls extend into load-bearing contact with the roof for the coke oven chambers. In the heating walls, three identical stretcher bricks in each course interlock by tongue-and-groove abutment joints. The middle brick abuts in a symmetrical relation with a flue side wall. Pairs of regenerators extend horizontally below each coke oven chamber with one regenerator of each pair alternately preheating air for combustion and receiving burnt gases while the second regenerator of each pair alternately receives burnt gases of combustion and preheats lean gas or preheats air for combustion when heating with rich gas. A dividing wall between each pair of regenerators includes rich gas feed ducts extending vertically to rich gas burners arranged in the heating flues. A rich gas burner is arranged closely adjacent the transverse wall between a pair of heating flues.

6 Claims, 8 Drawing Figures

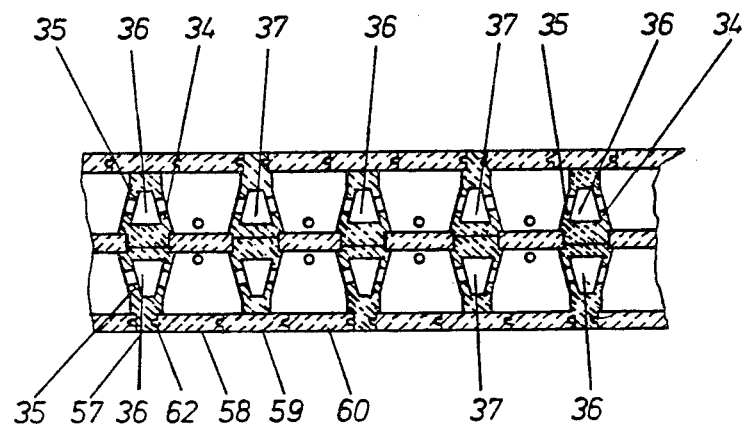
Fig. 6
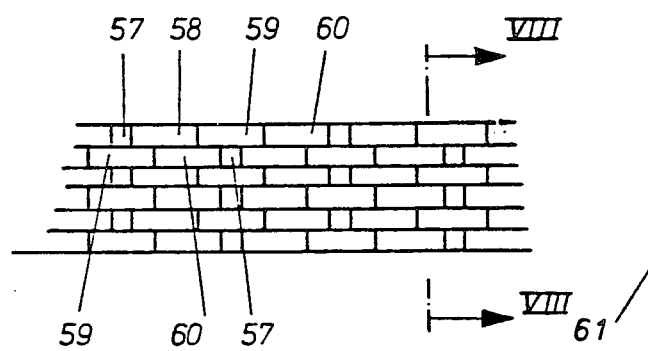
Fig. 7
Fig. 8

DOUBLE FLUE ARRANGEMENT IN HEATING WALLS FOR HORIZONTAL COKE OVENS

BACKGROUND OF THE INVENTION

This invention relates to a double heating flue arrangement in heating walls for lean-gas fired horizontal coke oven chambers wherein pairs of heating flues are disposed transversely to a horizontal axis of the coke oven chambers for operation in the regenerative change of draft.

Modern-day coke oven construction is without a practical embodiment of a row of double flues in heating walls despite the numerous proposals and suggestions by prior art patent disclosures. Most probably, designers of coke ovens were deterred by the relatively large number of walls that were believed necessary to construct the rows of double flues in heating walls. Moreover, it is believed that coke oven designers consider that double flue heating walls are much wider than a heating wall embodying a single row of heating flues and that in any event, there would be an increase to the brick weight relative to the heating wall volume.

SUMMARY OF THE INVENTION

It is an object of the present invention to provide a double heating flue arrangement for a heating wall in a battery of horizontal coke oven chambers wherein there is combined in such a double flue heating wall a known feeding arrangement for preheated combustion supporting agents at vertically-spaced intervals with a low-draft resistance of the heating system with a stable wall construction and the possibility of adjusting heat input lengthwise of the oven chamber but without increasing the brick weight per unit of volume for such a heating wall over that required for a heating wall consisting of a single row of heating flues and without increasing the width of the heating wall.

More specifically, according to the present invention, there is provided in a battery of coke ovens of the type heated regeneratively through the optional combustion of lean gas or rich gas in heating flues between coke oven chambers, the combination which includes vertical heating walls at opposite sides of the coke oven chambers extending along spaced-apart horizontal axes, a pair of regenerators arranged below each coke oven chamber to extend substantially the entire horizontal length thereof, one regenerator of each pair alternately preheating air for combustion and receiving burnt gases of combustion, the second regenerator of each pair alternately receiving burnt gases of combustion and preheating lean gas for combustion or preheating air for combustion when heating with rich gas, the flue walls subdividing the space between the vertical heating walls at the sides of adjacent coke oven chambers into a plurality of separate pairs of heating flues with each pair of heating flues being disposed in a side-by-side transverse relation to the horizontal axes of the coke oven chambers, the flue walls including side walls between pairs of heating flues, the lower part of each side wall having an internal passageway communicating through vertically-spaced exit orifices with each heating flue at the sides thereof, the side walls having upper parts extending into load-bearing contact with the roof for the coke oven chambers.

The present invention uses a known arrangement of twin-heating flues operating in alternate draft-directions with the individual pairs of heating flues being separated from one another by walls extending to the roof of the oven chamber. The battery of coke ovens according to the present invention further includes cross regenerators which extend along the length of the coke oven chambers and supplied with media in the same direction. The cross regenerators are subdivided by crosswalls into cells with control elements readily adjustable from the regenerator sole flue at the bottom entries and exits of the regenerator cells. However, the construction of the heating flues is devoid of top horizontal flues which interconnect the top ends of heating flues. This interconnection weakens the wall construction and renders it difficult to control the feeding of media to the various heating flues.

According to the present invention, in such a double heating wall, a pair of regenerators extends over the entire length and below each oven chamber. The regenerators are connected to vertical passages which are disposed between the heating flues arranged in rows beside the oven chamber. One of the passages serves for feeding lean gas while the next passage in the lengthwise direction of the heating wall always serves for feeding air. The lower part of the flue walls includes exit orifices at vertical-spaced intervals which communicate with the two adjacent heating flues at opposite sides of the flue walls. The walls which bound the passageways merge at the top into a bearing wall which extends to the oven roof.

The present invention provides a feature of great significance in the production of silica bricks employed in the heating walls. The masonry bond of the heating wall can be such that only one format of stretcher bricks is required which can be shortened as the spacing between the centers of the twin flues increases. Thus, it is no longer necessary for the stretcher bricks forming the heating wall to be approximately the same length as a heating flue.

The flue walls which bound the passageways and the bottom portions thereof converge toward the heating walls. In some instances, these flue walls abut the heating walls; while in other instances, the flue walls extend through the heating walls. Preferably, a brick of a flue wall is engaged in a heating wall in an arrangement that always alternates with a brick abutting the heating wall along the double heating wall. According to another feature of the present invention, three identical stretcher bricks formed with tongue-and-grooving at the abutment joints and bearing joints are used in each course of stretcher bricks in a heating wall between the ends of the flue walls which extend through the heating wall. The middle one of the three stretcher bricks is located symmetrically to the intermediate ends of the passage bounding the flue walls and such a flue wall therebetween.

Rich gas feed ducts extend vertically in every wall separating dissimilarly-fed regenerator pairs and extend to burners disposed on both sides of and close to the wall which separates the two flues of each pair. The resulting effect of this is that the rich gas rises along the separating wall and a laminar, non-eddy flow arises upon combustion with the attendent result that the evolution of nitrous oxides is reduced.

These features and advantages of the present invention as well as others will be more fully understood when the following description is read in light of the accompanying drawings, in which:

FIG. 6 is a view similar to FIG. 4 but illustrating a heating wall having enlarged heating flues lengthwise of the wall;

FIG. 7 is a view from an oven chamber of a heating wall of the type shown in FIG. 6; and FIG. 8 is a sectional view taken along line VIII—VIII of FIG. 7.

Figure 1:
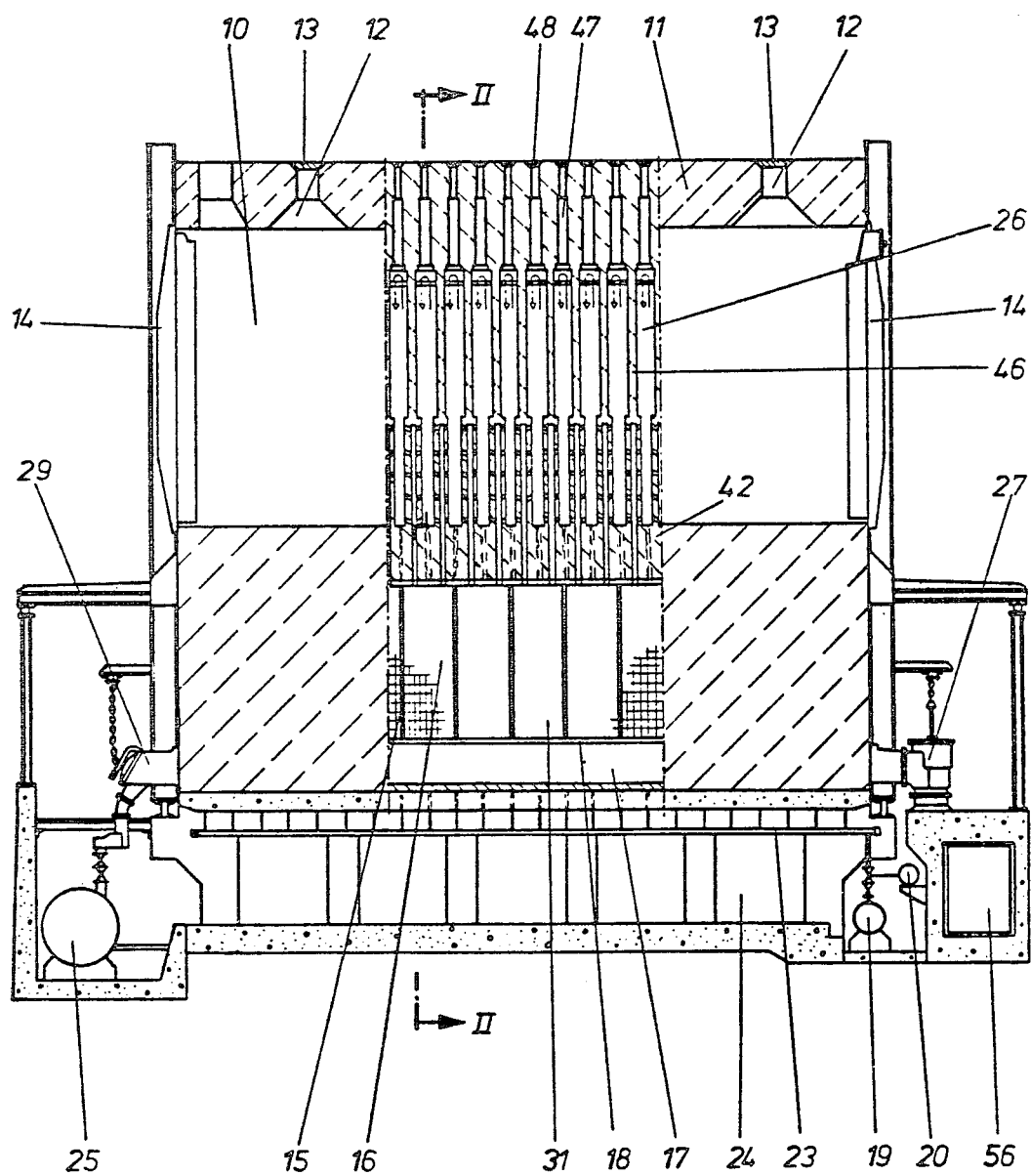
FIG. 1 is a longitudinal section through a regenerative underjet coke oven, the section being taken partly through an oven chamber and partly along line I—I of FIG. 2.
Figure 2:
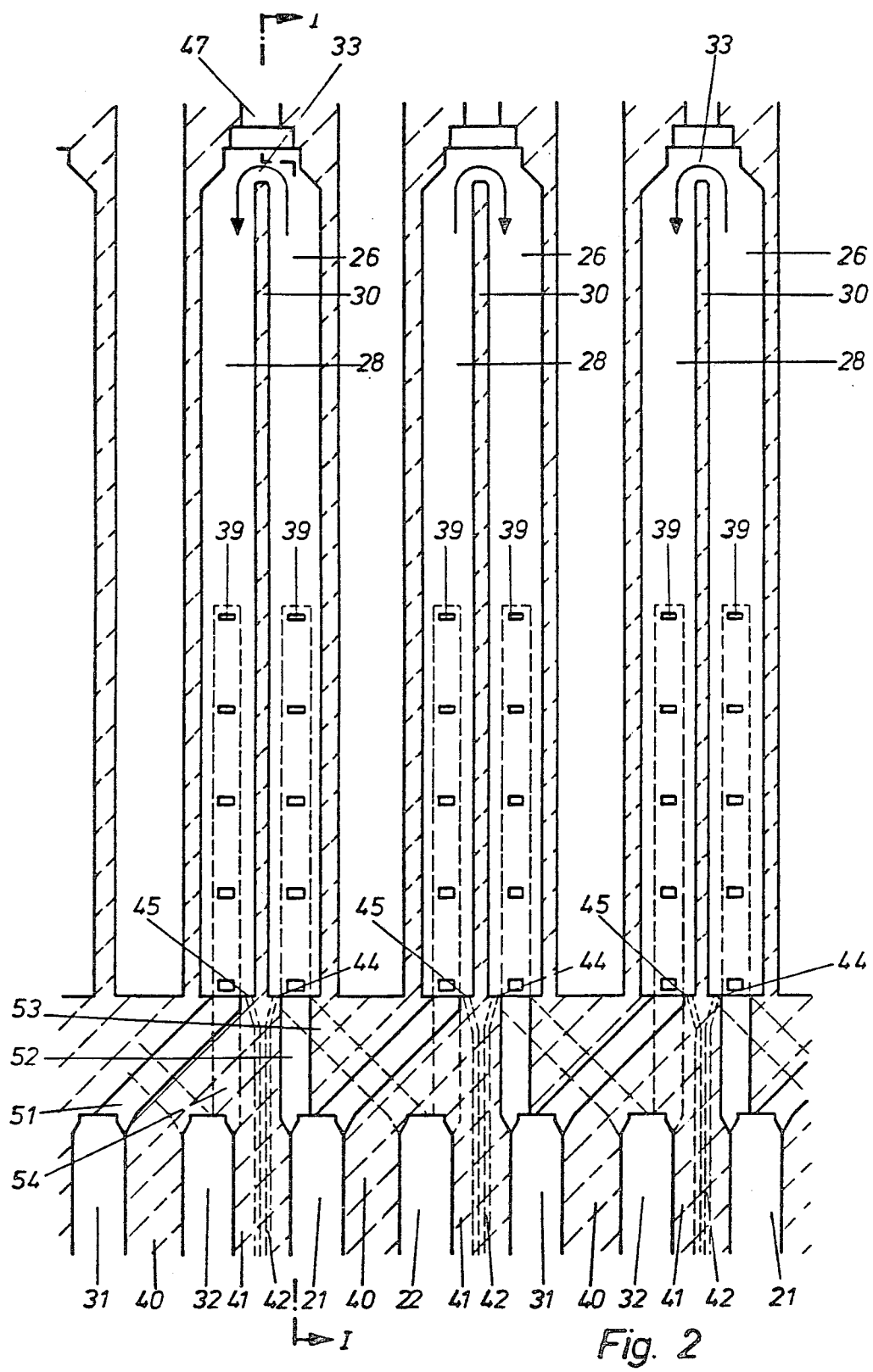
FIG. 2 is a sectional view taken along line II—II of FIG. 1.

In the drawings, particularly FIGS. 1 and 2, coke oven chambers 10 alternate with double heating walls along the length of a battery of coke ovens. The battery of coke ovens further includes an oven roof 11 formed with charging holes 12 that are closed by covers 13. A charging car, not shown, moves along the top of the battery of coke ovens to charge coal into the oven chambers through the charging holes 12. The opposite ends of each coke oven chamber 10 are closed by doors 14. Regenerators extend along the entire length of the coke oven chamber from the coke side to machine side thereof below the heating walls. As shown in FIG. 2, a pair of regenerators 21 and 22 alternates with another pair of regenerators 31 and 32. When the regenerators 21 and 22 are operated in the upward direction for preheating media, the regenerators 31 and 32 receive burnt gases. The pairs of regenerators reverse their direction of operation in the other regenerative half-period. Regenerators 22 and 32 are used alternately for preheating lean gas when heating with such gas. When heating is carried out by using rich gas, the regenerators 22 and 32 serve alternately to preheat combustion-supporting air. Sole flues 17 extend below the regenerators for communication therewith. Transverse walls 15 subdivide the regenerators into discrete regenerator cells or compartments 16. Between the various compartments 16 and the sole flues 17, control elements are provided for controlling the entry and exit of quantities of gaseous media.

Rich gas is distributed by a main 19 and compressed air used for decarburizing the rich gas distribution system is distributed by a main 20. The main 19 is connected to nozzle lines 23 disposed in a cellar located below the battery of coke ovens. Lean gas is distributed by a main 29 connected through reversing valves to the sole flues 17. Air valves 19 are open when air is admitted into the sole flues 17. The sole flues are connected to a common waste-gas flue 56 by waste-heat valves 27.

Figure 3:
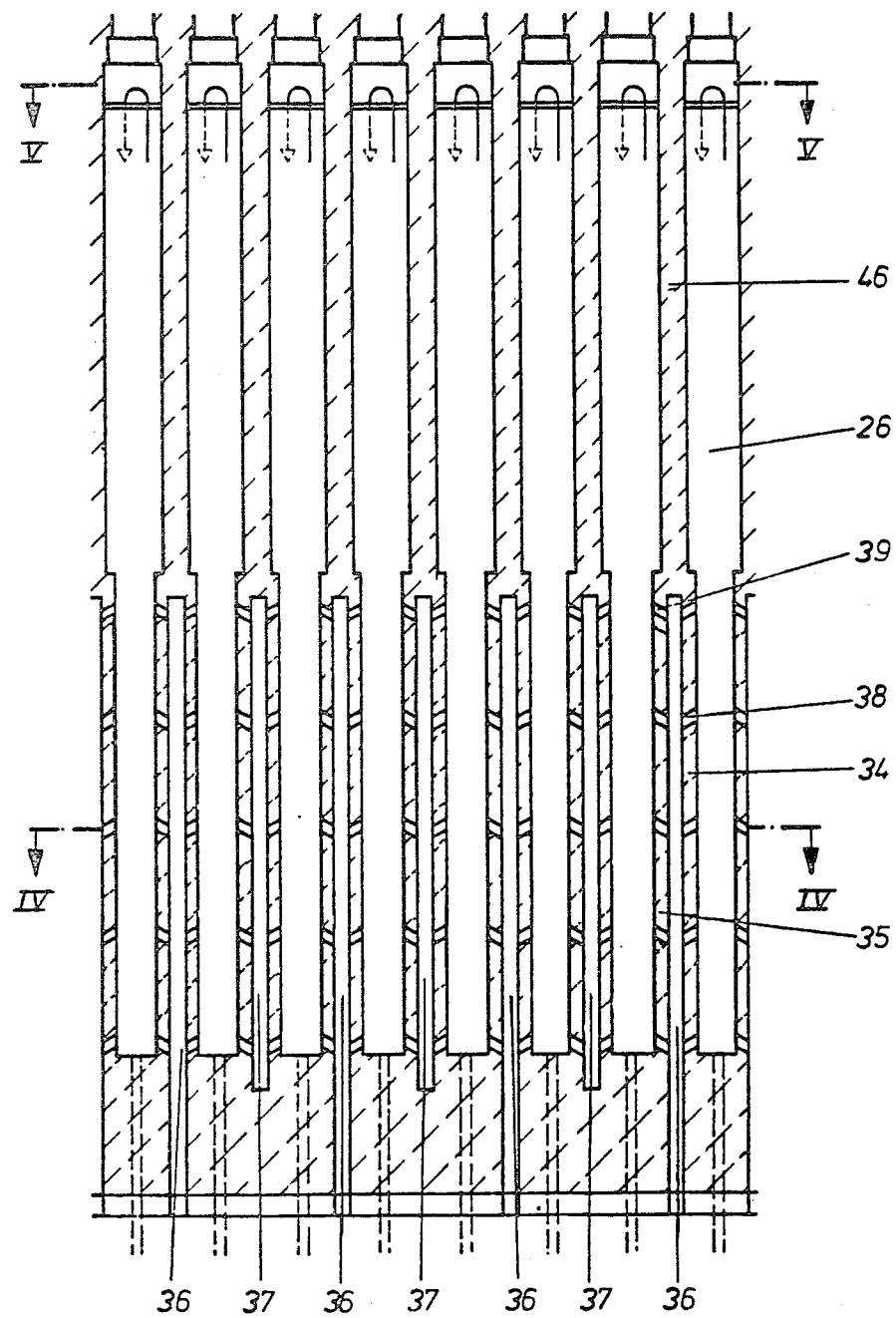
FIG. 3 is an enlarged view of only the heating flue shown in FIG. 1.

Cross twin-flues are arranged transversely between the heating walls for adjacent coke oven chambers. In one regenerative half-period, combustion takes place in flues 26 which communicate with heating flues 28 by way of top gaps 33 in the walls 30 which separate the twin flues from one another. Combustion occurs in the flues 28 in the other regenerative half-period and the waste gases flow downwardly along flues 26. Passageways 36 and 37 bonded by vertical walls 34 and 35 extend between the flues 26 and 28. Air is conducted along passageways 36 and when heating with lean gas, lean gas is conducted along passageways 37. When heating by rich gas, passageways 37 also serve for conducting air. The walls 34 and 35 are formed with vertically-spaced exit orifices 38 and 39 as best shown in FIGS. 1–3. The exit orifices 38 and 39 are provided in the two vertical walls 34 and 35 to communicate with the passageways 36 and 37, respectively, so that when heating with lean gas, the two adjacent heating flues 26 and 28 are supplied with lean gas and air at vertically-spaced intervals.

A wall 40 separates the two pairs of regenerators 21, 22 and 31, 32 which always conduct media in the same direction. A wall 41 is located between the regenerators which are supplied with media in the opposite direction with respect to the regenerator pairs 21, 22 and 31, 32. The wall 41 includes rich gas supply ducts 42. The ducts 42 are connected to the nozzle line 23 by a nozzle that is adjustable from the cellar 24. The ducts 42 extend to burners 44 in flues 26 and to burners 45 in flues 28 at opposite sides of wall 30 which separates these flues from one another.

Figure 4:
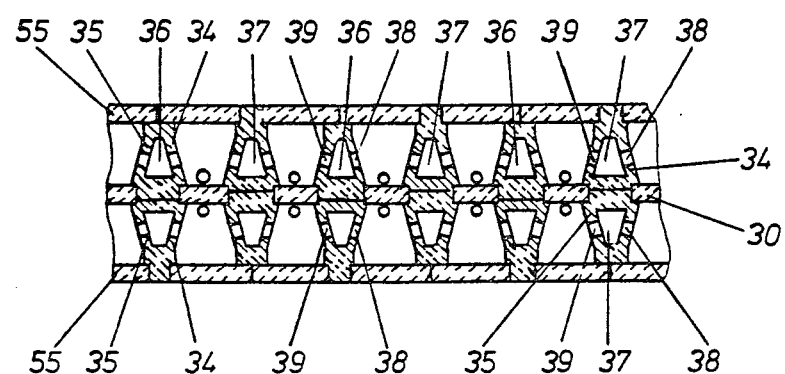
FIG. 4 is a sectional view taken along line IV—IV of FIG. 3.
Figure 5:
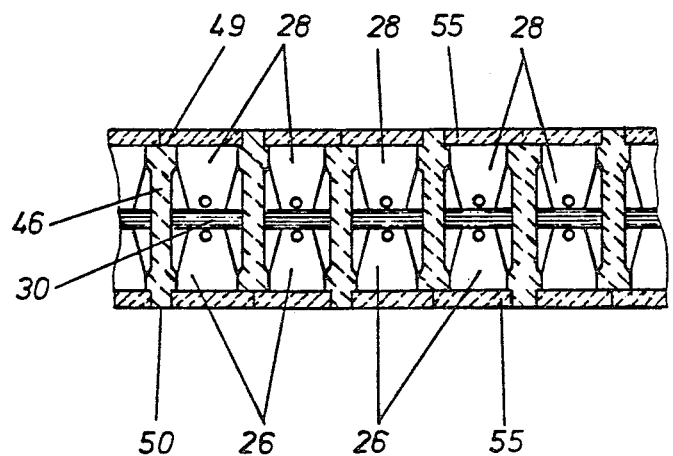
FIG. 5 is a sectional view taken along line V—V of FIG. 3.

The walls 34 and 35 converge toward heating walls 55. As best shown in FIGS. 4 and 5, the converged ends 49 of walls 34 and 35 abut against the inside surface of the heating walls 55. The converged ends 50 of walls 34 and 35 extend through the heating walls 55 to the coal-contacting surface thereof. Above the passageways 36 and 37, the walls 34 and 35 merge into a bearing wall 46 which extends as far as the oven roof and receives much of the load thereof. The walls 46 also receive the transverse forces which arise during pushing of coke from the oven chambers and when coal is moving which are unwanted phenomena in ovens having a top horizontal flue.

Inspection openings 47 in the oven roof 11 are closed by removable plugs 48. The plugs 48 permit observation of and access to the two flues 26 and 28.

Connecting ducts 51–54 connect the regenerators 21 and 22 disposed below an oven chamber 10 to the two heating flues disposed in rows beside the corresponding oven chamber 10. Corresponding connecting ducts communicating with the heating flues are associated with regenerators 31 and 32.

The operation of the above-described coke oven battery will now be given. When lean gas heating is used, the two regenerators 21 and 22 below a coke chamber 10 are supplied with media in an upward direction in one regenerative half-period, i.e., the regenerator 21 is supplied with air for preheating and the regenerator 22 is supplied with lean gas for preheating. The preheated media flows through ducts 51–54 into those flues 26 or 28 which are disposed in a row at both sides of the associated coke oven chamber 10. Preheated air flows through passageways 36 between the flues and preheated lean gas flows in passageways 37 between the flues. From passageways 36 and 37, the media flow through orifices 38 and 39 in the walls 34 and 35. The media burns as it rises and flows through openings 33 in walls 30 into the heating flues 26, 28 which cooperate in the draft change. The flues are disposed in a row beside the two adjacent coke oven chambers 10. The media descends and flows through openings 38 and 39, passageways 36 and 37, and ducts 51–54 into regenerators 31 and 32 of the two adjacent pairs which are separated by walls 41. The smoke gases then flow through sole flues 17, waste-gas valves 27 and into the common waste-gas flue 56.

After reversal, the two adjacent regenerators in the pair of regenerators 31, 32 serve to preheat the gaseous media and the burnt gases descend along flues 26, 28 of the two rows adjacent the chamber first studied. The burnt gases flow through openings 38, 39 into passageways 36, 37 and then into ducts 51–54 from where the burnt gases are delivered to regenerators 21, 22 and thence to sole flues 17 and into the common waste-gas flue 56.

When heating with rich gas, the regenerators 22 serve alternately to preheat air which, in this instance, is supplied through passageways 36, 37.

It is to be understood, of course, that when heating with lean gas such gas is supplied from main 25 and combustion-supporting air is supplied through valves 29 which are open to feed air into sole flues 17. Rich gas is supplied from main 19 through nozzle lines 23 and ducts 42 for delivery to rich gas burners 44 and 45. When viewed lengthwise of the coke oven battery, the oven chambers, in which the gases are burning in the upward direction in the heating flue rows adjacent each oven chamber, alternate consistently with oven chambers in which the heating flues disposed in the adjacent rows are supplied in the downward direction.

Control elements 18 provided between the sole flues 17 and the various regenerator cells 16 provide very accurate control of the intensity of heating in the various heating flues so that heating can be adapted to variations in the heat consumption caused by heat radiation from the oven tops, narrowing of the oven chambers and other factors.

Since walls 34 and 35 merge at the tops into strong loadbearing walls 46 which are distributed along the entire heating walls, the masonry bonding is very strong, particularly when walls 46, like the extensions of walls 34 and 35, always engage in an alternate manner in one or the other of the heating walls. Such an alternate arrangement has been customary for more than 50 years in Otto ovens. The resulting structure is very stable, can bear heavy loads and resiliently take up forces acting on the oven chamber walls during operation.

The various walls used in the heating walls between oven chambers can be thinner for a given structural stability than a single bond in the case of walls subdivided into just a single row of heating flues whereby the weight of the bricks is reduced. This is because in each heating wall, three longitudinal walls, that is, in addition to the two heating walls the separating walls disposed between the heating flue pairs or cross twin flues are reinforced.

The partition between up-burning and down-burning flues experiences the full heating effect of combustion during both half-periods. The temperature of the partition rises to a higher temperature than the two heating walls which are continuously colled by a coal charge. Consequently, at the higher temperatures in the heating flues, the radiation from the partitions or walls 30 acts continuously on the two heating walls 55. In view of the strong bonding of the complete wall, the stretcher bricks in the heating walls can be relatively thin such as, for example, 80 millimeters or less, so that coking times are shorter.

A further feature of the invention is that there is a savings of plugs 48 required to close apertures 47 since the up-burning flue and the down-burning flue can be observed through the same inspection aperture 47. The present invention further provides features of bonding shown in FIGS. 6–8 for increasing the center distance spacing of cross twin flues, i.e., an increase in the directly-heated partial surface of the chamber wall. Three stretcher bricks 58, 59 and 60 of identical format are disposed between those ends 57 of the walls 34 and 35 which engage in the heating walls. Tongue-and-groove connections 61 and 62, respectively, are provided in the bearing joints and in the abutment joints. The middle one of the three stretcher bricks is disposed symmetrically to the walls 34 or 35.

The intervals between the orifices 38 and 39 in walls 34 and 35 can be arranged in any required and different manner on the one hand for lean gas and, on the other hand, for air, so that the pattern of combustion can be controlled and so adjusted that there is uniform heating of the chamber contents vertically and only a reduced quantity of nitrous oxides is formed in the flue gas.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a battery of coke ovens of the type heated regeneratively through the optional combustion of lean gas or rich gas in heating flues between coke oven chambers extending along spaced-apart horizontal axes, the improvement comprising:

vertical heating walls at opposite sides of said coke oven chambers, a pair of regenerators arranged below each coke oven chamber to extend substantially the entire horizontal length thereof, one regenerator of each pair alternately preheating air for combustion and receiving burnt gases of combustion, the second regenerator of each pair alternately receiving burnt gas of combustion and preheating lean gas for combustion or preheating air for combustion when heating with rich gas, flue walls subdividing the space between the vertical heating walls at the sides of adjacent coke oven chambers into a plurality of separate pairs of heating flues with each pair of heating flues being disposed in a side-by-side transverse relation to the horizontal axes of the coke oven chambers, said flue walls including side walls between pairs of heating flues, the lower part of each side wall having an internal passageway communicating with one of said pairs of regenerators and communicating through vertically-spaced exit orifices with each heating flue at the sides thereof, said side walls having upper parts extending into load-bearing contact with a roof for said coke oven chambers, and means forming ducts for conducting gaseous media between each of the pairs of regenerators below an oven chamber and the internal passageways in alternate side walls of heating flues along each oven chamber.

2. The battery of coke ovens according to claim 1 further comprising a rich gas burner in each flue adjacent the flue wall between the heating flues of each pair, and wherein said pair of regenerators arranged below each coke oven chamber includes a dividing wall between each pair of regenerators, rich gas feed ducts exiting vertically along said dividing wall for conducting rich gas to said rich gas burners.

3. The coke oven battery according to claim 1 wherein said lower portion of the side walls forming each internal passageway between pairs of heating flues extends horizontally to converge at the vertical heating walls forming side wall portions, some of said side wall portions abut against the vertical heating wall and other of said side wall portions extend through the vertical heating wall.

4. The coke oven battery according to claim 1 wherein said upper parts of said side walls in each heating flue between adjacent coke oven chambers consist of superimposed bricks each horizontally abutting one vertical heating wall while the opposite end of the brick extends through the laterally-spaced heating wall.

5. The coke oven battery according to claim 4 wherein said vertical heating walls each includes courses of stretcher bricks, the stretcher bricks in each course including three identical bircks interlocked by tongue-and-groove abutment joints with one of the three interlocked bricks abutting against one of said superimposed bricks forming side walls of heating flues.

6. The coke oven battery according to claim 5 wherein each of said flue walls lies in an abutting symmetrical relation to the middle brick of the three interlocked identical bricks within each course in a heating wall.

* * * * *